US011320456B2

(12) United States Patent
Shigekawa

(10) Patent No.: US 11,320,456 B2
(45) Date of Patent: May 3, 2022

(54) SCANNING PROBE MICROSCOPE

(71) Applicant: GTHERANOSTICS CO., LTD., Tokyo (JP)

(72) Inventor: Hidemi Shigekawa, Tsukuba (JP)

(73) Assignee: GTHERANOSTICS CO., LTD., Tokyo (JP)

( * ) Notice: Subject to any disclaimer, the term of this patent is extended or adjusted under 35 U.S.C. 154(b) by 0 days.

(21) Appl. No.: 16/963,040

(22) PCT Filed: Jan. 18, 2019

(86) PCT No.: PCT/JP2019/001480
§ 371 (c)(1),
(2) Date: Sep. 22, 2020

(87) PCT Pub. No.: WO2019/142914
PCT Pub. Date: Jul. 25, 2019

(65) Prior Publication Data
US 2021/0011052 A1 Jan. 14, 2021

(30) Foreign Application Priority Data
Jan. 19, 2018 (JP) .............................. JP2018-007557

(51) Int. Cl.
*G01Q 60/10* (2010.01)
*G01N 21/63* (2006.01)
*G01Q 70/08* (2010.01)

(52) U.S. Cl.
CPC ........... *G01Q 60/10* (2013.01); *G01N 21/636* (2013.01); *G01Q 70/08* (2013.01)

(58) Field of Classification Search
CPC .............................. G01Q 60/10; G01N 21/636
See application file for complete search history.

(56) References Cited

U.S. PATENT DOCUMENTS

| 2010/0088787 A1 | 4/2010 | Shigekawa et al. |
| 2014/0240710 A1 | 8/2014 | Shigekawa et al. |

FOREIGN PATENT DOCUMENTS

| JP | 2008-139028 A | 6/2008 |
| JP | 2013-032993 A | 2/2013 |

OTHER PUBLICATIONS

International Search Report, PCT/JP2019/001480, dated Apr. 16, 2019, 2 pgs.
Shigekawa, Hidemi, et al., "Optical Pump-Probe STM," Kenbikyo, vol. 52, No. 1 (2017), pp. 46-50 with English language abstract.
(Continued)

*Primary Examiner* — Eliza W Osenbaugh-Stewart
(74) *Attorney, Agent, or Firm* — Volpe Koenig

(57) ABSTRACT

A scanning probe microscope includes: a pump light output unit that emits pump light having a first specified phase to a specimen and performs emission of the pump light a plurality of number of times to excite the specimen; a probe light output unit that emits probe light having a second specified phase to the specimen once while the specimen is excited by one-time emission of the pump light; and a scanning probe that detects, from the specimen, a probe signal corresponding to each one-time emission of the probe light, wherein the pump light output unit or the probe light output unit includes a delay time adjustment unit that adjusts delay time from a start of the emission of the pump light until a start of the emission of the probe light.

6 Claims, 11 Drawing Sheets

(56) References Cited

OTHER PUBLICATIONS

Shigekawa, Hidemi, "Development of sub-cycle time-resolved STM and its applications," Science and Engineering (Mathematics/Physics), 1 pg. (Japanese language with English translation).
Submission Form of Certificate of Exception to Lack of Novelty, Japanese Patent Application No. 2018-007557, Feb. 1, 2018, 3 pgs. (Japanese language with English translation).
Extended European Search Report dated Sep. 13, 2021 for European Patent Application No. 19741730.6.

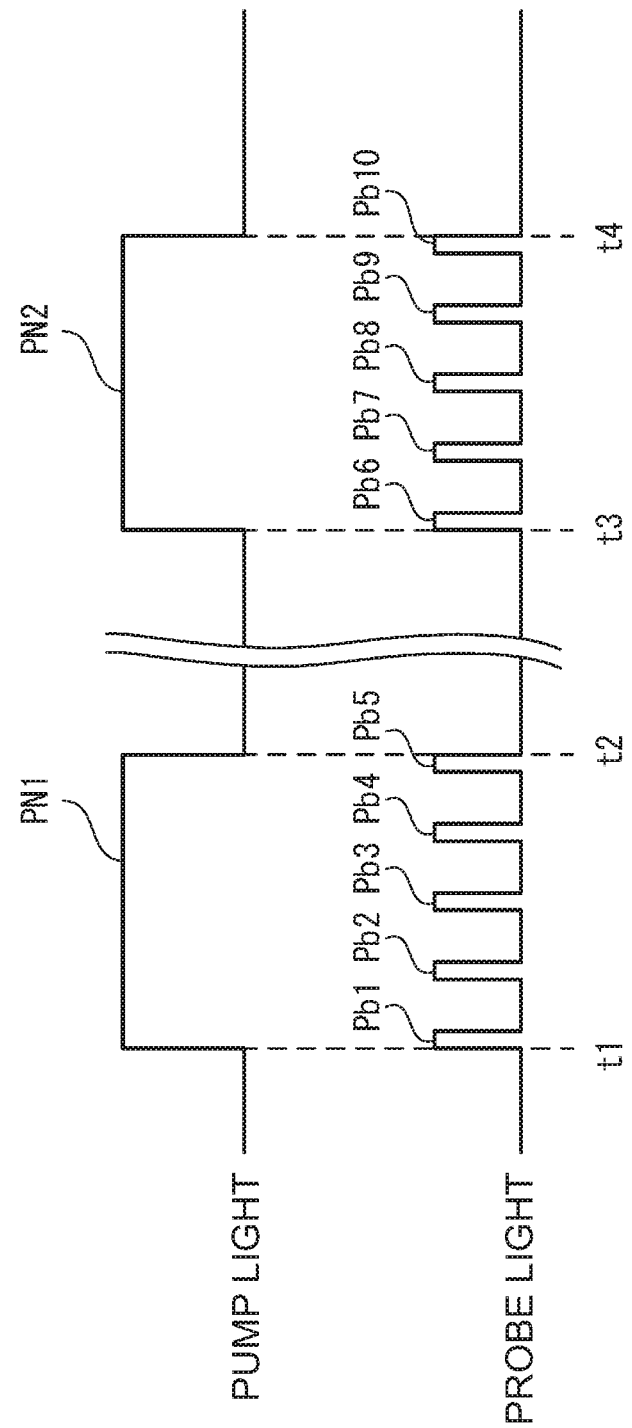

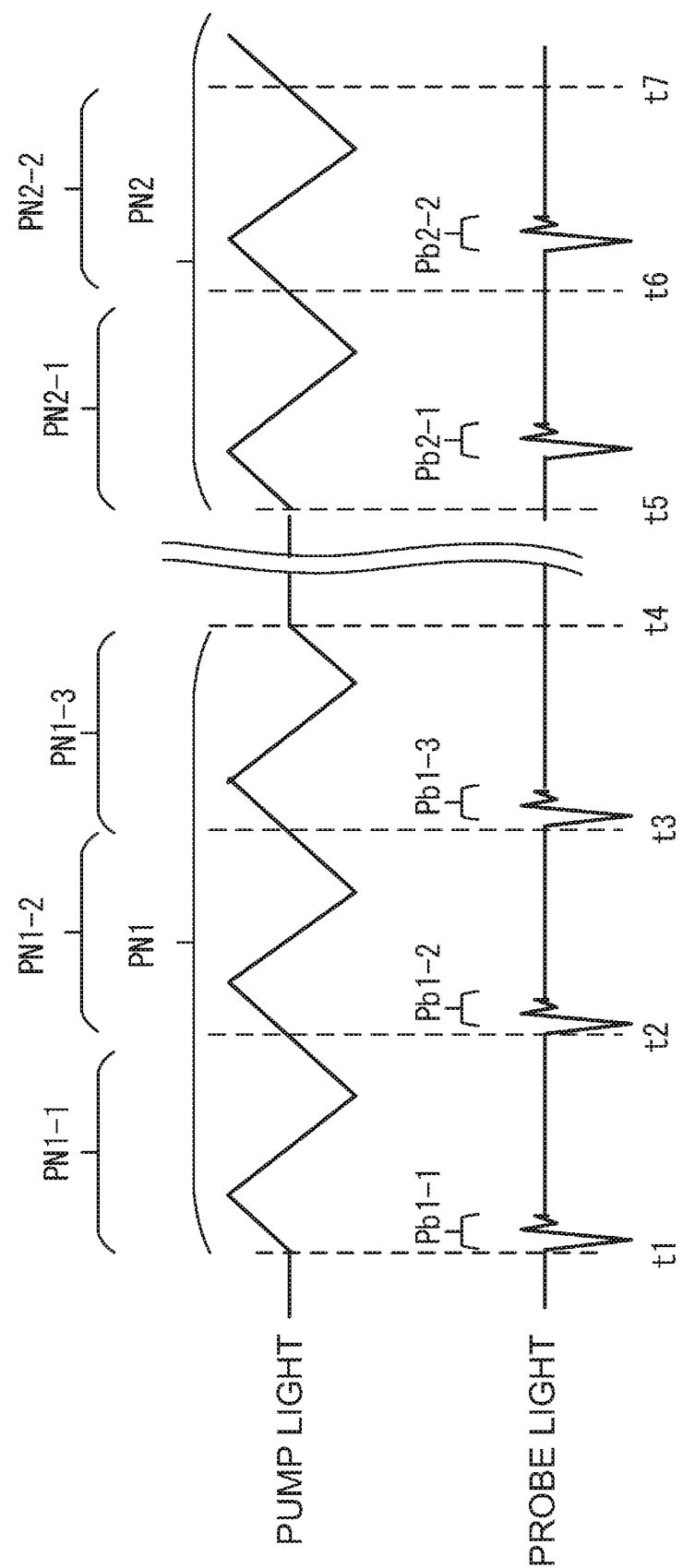

SCANNING PROBE MICROSCOPE

TECHNICAL FIELD

The present invention relates to a scanning probe microscope.

BACKGROUND ART

Conventionally, there has been provided an Optical Pump-Probe Scanning Tunneling Microscopy (OPP-STM) as an apparatus for acquiring time-resolved information of a specimen through atomic- and molecular-level spatial resolutions. With the OPP-STM, a tunneling current flowing between a probe and the specimen is read as a probe signal while emitting a pulse pair immediately below the probe. Consequently, a surface phenomenon of the specimen can be analyzed in a femtosecond region. For example, PTL 1 discloses a pump probe measuring apparatus including: an ultrashort light pulse laser generation unit that generates a first ultrashort light pulse train which becomes pump light, a second ultrashort light pulse train which has first delay time with respect to the pump light and becomes probe light, and a third ultrashort light pulse train which has second delay time with respect to the pump light and becomes probe light; a light shutter unit into which the second and third ultrashort light pulse trains enter; a light shutter control unit that controls the light shutter unit; an irradiation optical system that emits the pump light and the probe light to a specimen; and a detection unit including a sensor for detecting a probe signal from the specimen, and a phase-sensitive detection means coupled to the sensor, wherein the second ultrashort light pulse train and the third ultrashort light pulse train are alternately emitted as the probe light to the specimen by the light shutter control unit by cyclically modulating the delay time of the probe light with respect to the pump light, and the probe signal is synchronized with the cyclic modulation of the delay time and then detected by the phase-sensitive detection means.

CITATION LIST

Patent Literature

PTL 1: Japanese Patent Application Laid-Open (Kokai) Publication No. 2013-32993

SUMMARY OF THE INVENTION

Problems to be Solved by the Invention

The inventors have found a new challenge that it is necessary to precisely evaluate quantum dynamics of a photoinduced carrier, including charge transfer, transition, and conduction, in order to further promote the advancement of nanoscale science technology and develop new functions. However, the invention described in PTL 1 cannot observe the dynamics while it's controlling.

Means to Solve the Problems

A scanning probe microscope according to a first aspect of the present invention includes: a pump light output unit that emits pump light having a first specified phase to a specimen and performs emission of the pump light a plurality of number of times to excite the specimen; a probe light output unit that emits probe light having a second specified phase to the specimen once while the specimen is excited by one-time emission of the pump light; and a scanning probe that detects, from the specimen, a probe signal corresponding to each one-time emission of the probe light, wherein the pump light output unit or the probe light output unit includes a delay time adjustment unit that adjusts delay time from a start of the emission of the pump light until a start of the emission of the probe light. A scanning probe microscope according to a second aspect of the present invention includes: a pump light output unit that emits pump light having a first specified phase to a specimen and performs emission of the pump light once or more to excite the specimen; a probe light output unit that emits probe light having a second specified phase to the specimen once or more while the specimen is excited by one-time emission of the pump light; and a scanning probe that detects, from the specimen, a probe signal corresponding to each one-time emission of the probe light.

Advantageous Effects of the Invention

The quantum dynamics can be controlled and observed according to the present invention.

BRIEF DESCRIPTION OF DRAWINGS

FIG. 3(*b*) is a diagram illustrating a frequency spectrum of the pump light 21;

FIG. 10 is a schematic diagram illustrating time variation of the pump light 21 and the probe light 31 according to a third embodiment; and FIG. 11 is a schematic diagram illustrating time variation of the pump light 21 and the probe light 31 according to Variation 2 of the third embodiment.

DESCRIPTION OF EMBODIMENTS

First Embodiment

A first embodiment of an electron microscope which is a scanning probe microscope according to the present invention will be explained below with reference to FIG. 1 to FIG. 4.

Figure 1:
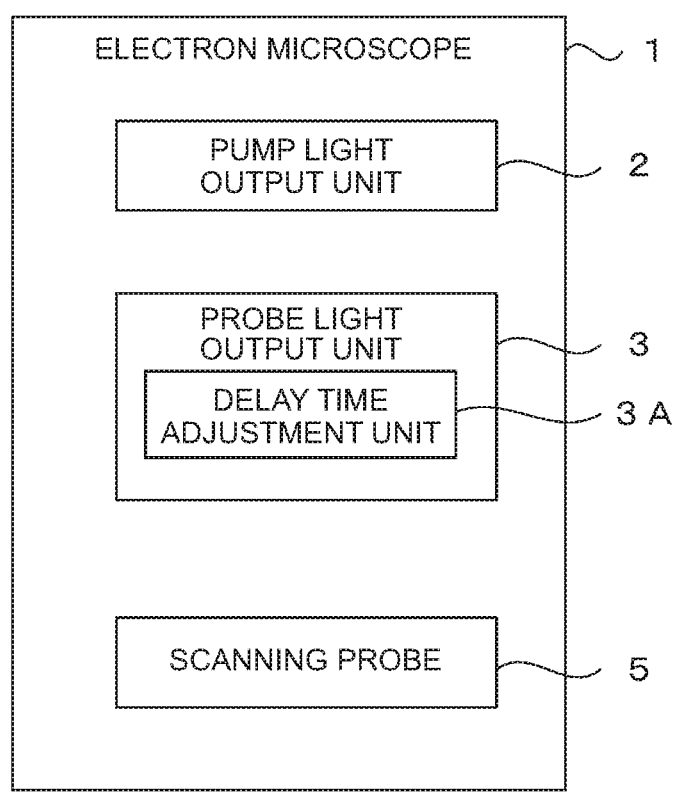
FIG. 1 is a diagram illustrating a schematic configuration of an electron microscope 1 according to a first embodiment.

FIG. 1 is a diagram illustrating a schematic configuration of an electron microscope 1. The electron microscope 1 includes a pump light output unit 2, a probe light output unit 3, and a scanning probe 5. The pump light output unit 2 and the probe light output unit 3 operate in synchronization with each other as described later. The probe light output unit 3 includes a delay time adjustment unit 3A that adjusts delay-time.

Figure 2:
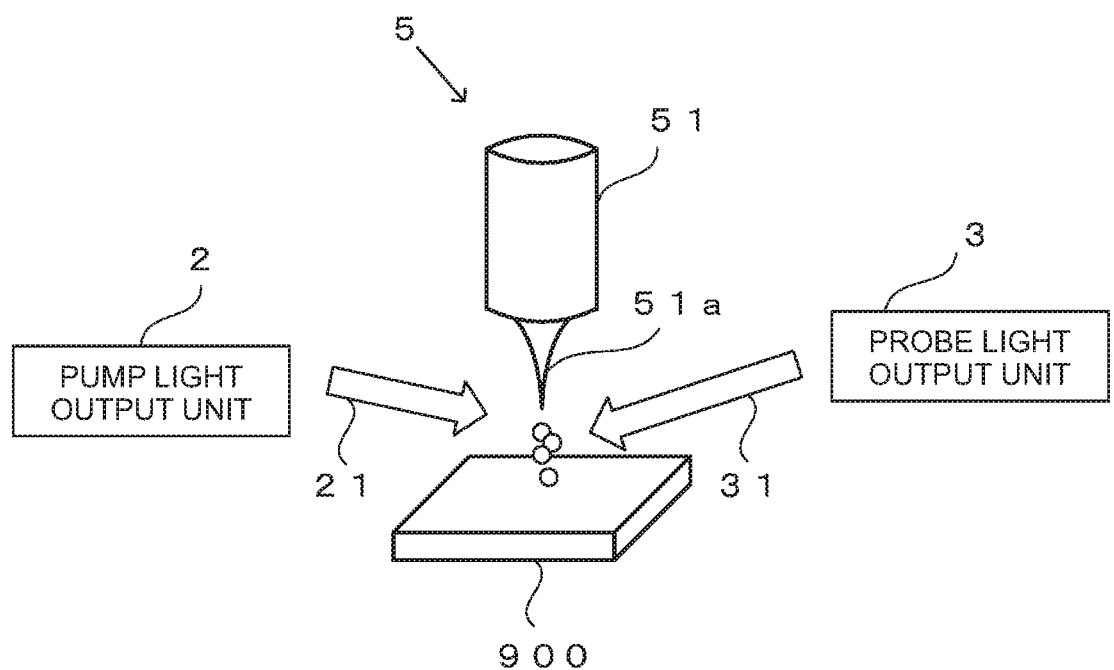
FIG. 2 is an enlarged view of an area around the tip of a scanning probe 5.

FIG. 2 is an enlarged view of an area around the tip of a scanning probe 5. A specimen 900 is an observation object of the electron microscope 1 and is placed around the tip of the scanning probe 5. The scanning probe 5 includes a probe 51. When a voltage is applied between the probe 51 and the specimen 900, a tunneling current flows between a probe tip 51a, which is the tip of the probe 51, and a surface of the specimen 900. An electric field is enhanced by tip-enhancement at this probe tip 51a and its enhancement width varies widely; and, for example, the electric field may be sometimes enhanced to 10 to the $5^{th}$ to $6^{th}$ power.

The pump light output unit 2 emits pump light 21 to the specimen 900 and the probe light output unit 3 emits probe light 31 to the specimen 900. When the specimen 900 is irradiated with the pump light 21, it is excited; and the probe light 31 is emitted to the specimen 900 while the specimen 900 is excited as described later. As the probe light 31 causes a voltage to be applied between the probe 51 and the specimen 900, the tunneling current flowing between the probe tip 51a and the surface of the specimen 900 is acquired as a probe signal. The scanning probe 5 includes a storage unit, which is not illustrated in the drawing, and records the acquired probe signal.

The delay time adjustment unit 3A adjusts time delay from the start of emission of the pump light 21 to the specimen 900 until the start of emission of the probe light 31 to the specimen 900. Since the pump light output unit 2 and the probe light output unit 3 operate in synchronization with each other as mentioned earlier, the electron microscope 1 can set the delay time arbitrarily by means of the delay time adjustment unit 3A. In the first embodiment, measurement is performed by changing the delay time in a plurality of manners by using the delay time adjustment unit 3A.

The pump light output unit 2 is only required to have a specified phase and be capable of outputting the light with intensity suited for the emission to a tunnel junction generated between the probe tip 51a and the surface of the specimen 900, so that there is no particular limitation on its configuration. The pump light output unit 2 includes, for example, a laser light source and a nonlinear optical crystal; and the nonlinear optical crystal is irradiated with laser pulses generated by the laser light source, thereby generating terahertz waves. These terahertz waves have the same phase every time. A Ti-sapphire laser can be used as the laser light source. Crystal of lithium niobate (LiNbO$_3$) can be used as the nonlinear optical crystal. Incidentally, the pump light output unit 2 may be configured by further including a plurality of optical systems.

Figure 3:
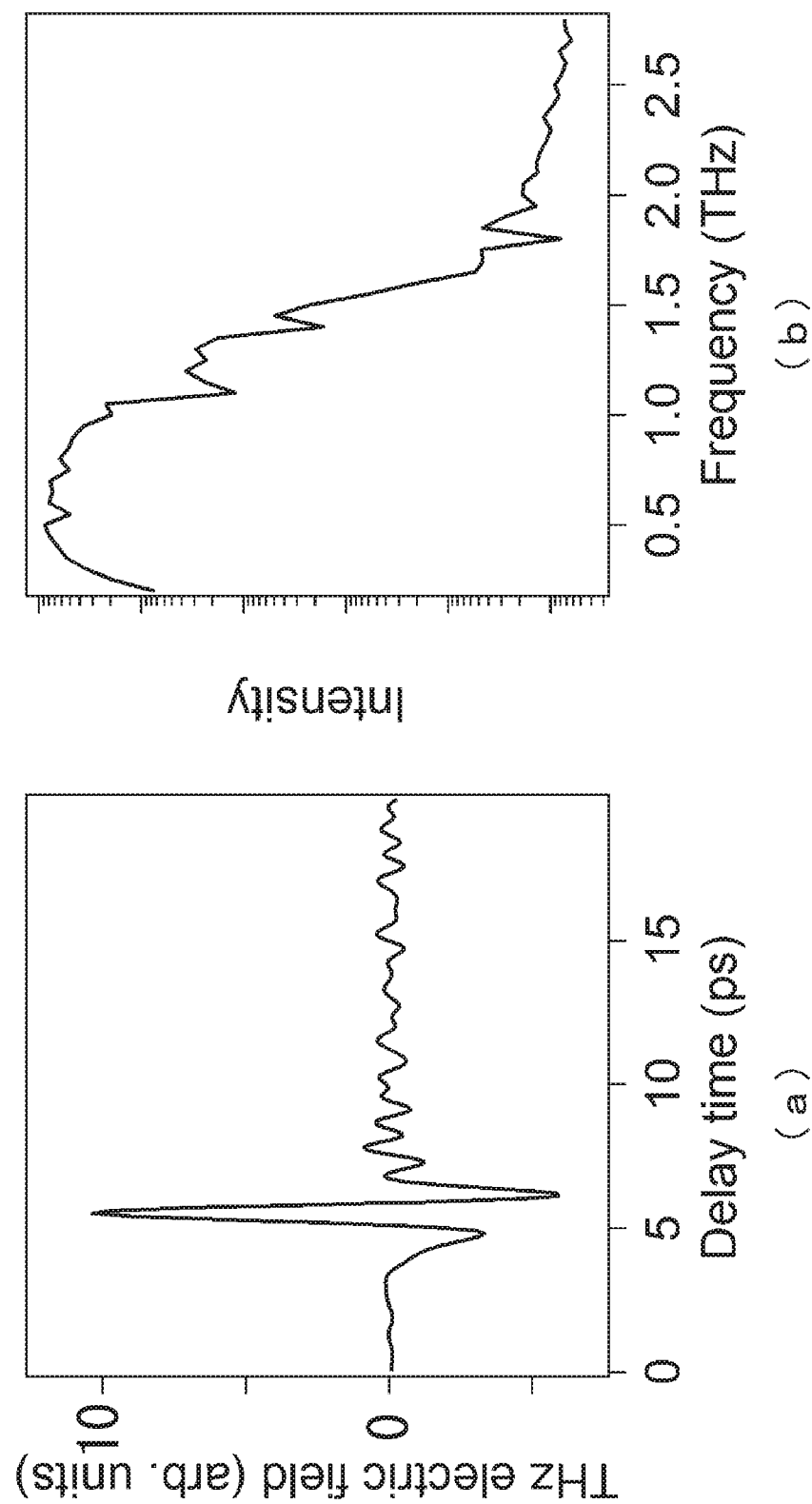
FIG. 3(*a*) is a diagram illustrating a time waveform of pump light 21.

FIG. 3(a) is a diagram illustrating a time waveform of the pump light 21 obtained by using a Ti-sapphire laser with iterative frequency of 1 MHz, pulse duration of 130 fs, and a center wavelength of 800 nm as a light source and causing this Ti-sapphire laser to transmit through the LiNbO$_3$ crystal. FIG. 3(b) is a diagram illustrating a frequency spectrum of FIG. 3(a). FIG. 3(a) and FIG. 3(b) illustrate the time waveform and the frequency spectrum of the pump light 21 corresponding to one pulse which is output by the laser light source, and this is called the "pump light 21 which is output in one-time emission" in this embodiment. Since the laser light source has the iterative frequency of 1 MHz, the pump light output unit 2 outputs the pump light 21 with the same phase as illustrated in FIG. 3 every 1 μs.

The pump light output unit 2 does not include a mechanism for adjusting phases; however, as its physical property, the phases of the pump light 21 which is output become the same. In other words, the pump light output unit 2 outputs the pump light 21 having a first specified phase.

Time variation of the electric field intensity illustrated in FIG. 3(a) are as follows. Specifically speaking, the electric field intensity is 0 kV/cm at 0 ps at the left end of the drawing, swings significantly on the minus side at around 4 ps, and inverts at around 5 ps and rapidly increases and reaches to 10 kV/cm. Subsequently, the electric field intensity decreases to approximately −6 kV/cm and then repeats minutely increasing and decreasing at around 0 kV/cm. The details of the time variation of the electric field intensity are as described above; however, if an attention is focused on sine waves in a cycle of approximately 2 ps with an amplitude of 10 kV/cm with regard to the pump light 21 which is output in one-time emission as illustrated in FIG. 3(a), only a half cycle is included. Furthermore, considering that the size of the electric field intensity impacts a bias voltage, that is, the tunneling current between the probe 51 and the specimen 900, the size of the electric field intensity will be determined based on a region (part) of the waves where the amplitude is relatively large.

Therefore, it can be considered that the pump light 21 which is output in one-time emission is composed of only a half cycle of the sine waves having a relatively large amplitude among these waves. In other words, the pump light 21 which is output in one-time emission is composed of only a half cycle of the waves with dominant intensity. Furthermore, a minus value which is −6 kV/cm exists around 6 ps in FIG. 3(a); and it can be considered that the pump light 21 which is output in one-time emission is composed of one cycle of the electric field with a certain large amplitude.

Since the pump light 21 contains a wide range of frequency components as illustrated in FIG. 3(b), various reactions can be caused by the pump light 21.

The probe light output unit 3 like the pump light output unit 2 includes, for example, a laser light source and nonlinear optical crystal and generates light by irradiating the nonlinear optical crystal with laser pulses generated by the laser light source. However, the probe light 31 needs to have a shorter cycle than that of the pump light 21, so that at least one of the laser light source and the nonlinear optical crystal to be used is different from that of the pump light output unit 2. The probe light output unit 3 can use a Ti-sapphire laser with pulse duration of 10 fs as the laser light source. Gallium selenide (GaSe) can be used as the nonlinear optical crystal. Incidentally, the probe light output unit 3 may be configured by further including a plurality of optical systems. A waveform of the probe light 31 is substantially the same as that illustrated in FIG. 3(a). However, the probe light 31 has a shorter cycle than that of the pump light 21 and one cycle of the probe light 31 is approximately 30 fs (30×10^-15 seconds).

Furthermore, the probe light output unit 3, like the pump light output unit 2, does not have a mechanism for adjusting phases; however, as its physical property, phases of the probe light 31 which is output become the same. In other words, the probe light output unit 3 outputs the probe light 31 having a second specified phase. The relationship between the phase of the pump light 21 and the phase of the probe light 31 is arbitrary and both the phases do not have to be the same. In this embodiment, it is important that the phases of the pump light 21 and the probe light 31 do not change.

The pump light output unit 2 and the probe light output unit 3 synchronize their outputs. Regarding a means for synchronization, their respective laser light sources may be operated in synchronization or the outputs from their respective laser light sources may be made to pass through the same slit or slits which operate in conjunction with each other.

The probe 51 is formed of, for example, a platina-iridium (80/20%) wire with a diameter of 0.3 mm and the probe tip 51a has a diameter of 40 nm.

Figure 4:
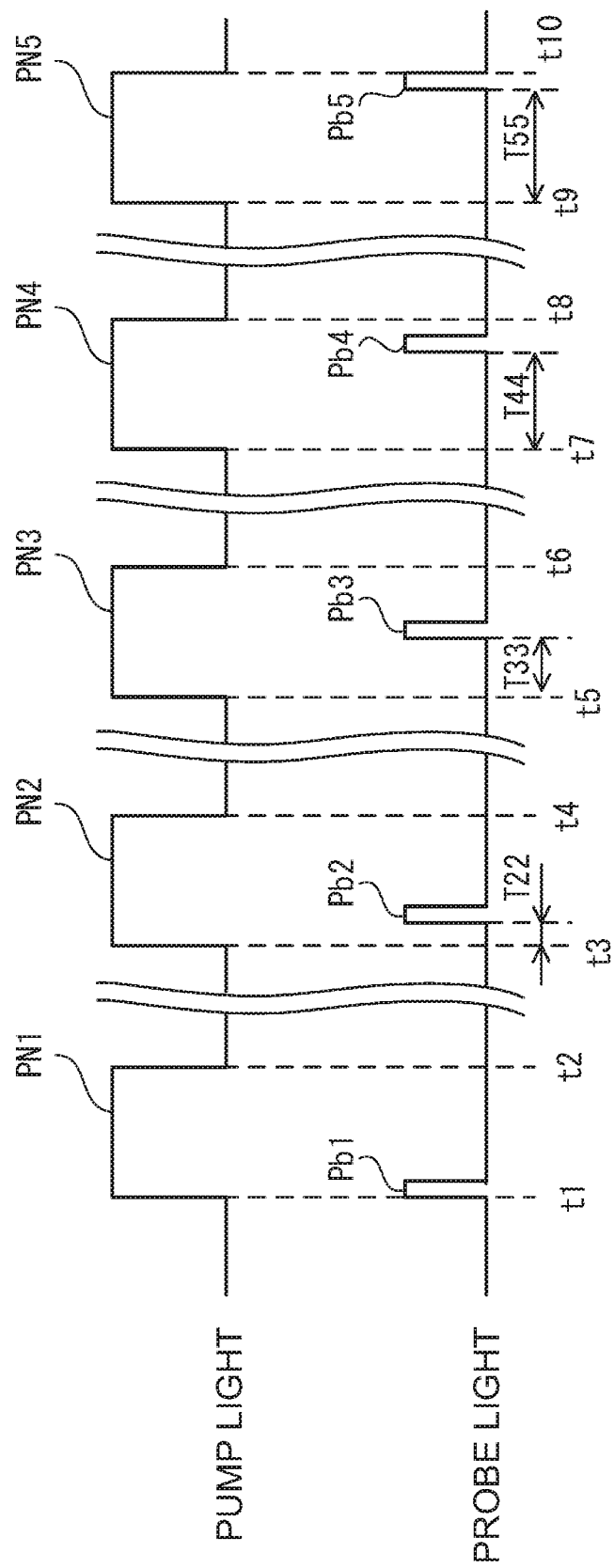
FIG. 4 is a schematic diagram illustrating time variation of the pump light 21 and probe light 31 according to the first embodiment.

FIG. 4 is a schematic diagram illustrating time variation of the pump light 21 and the probe light 31 according to the first embodiment. An upper part of FIG. 4 is a diagram illustrating time variation of intensity of the pump light 21 emitted to the specimen 900 and a lower part of FIG. 4 is a diagram illustrating time variation of intensity of the probe light 31 emitted to the specimen 900. However, in the lower part of FIG. 4, emission time of the probe light 31 is indicated as longer than actual emission time in order to enhance visibility. Furthermore, for the convenience of drafting the diagram in FIG. 4, the intensity of the pump light 21 and the probe light 31 is expressed as rectangular waves; however, the intensity is actually as indicated in FIG. 3. Furthermore, FIG. 4 shows that the phase of the pump light 21 is constant and the phase of the probe light 31 is constant.

In an example illustrated in FIG. 4, the delay time is set in five patterns. Specifically, there are: a first pattern indicated as time t1 to t2; a second pattern indicated as time t3 to t4; a third pattern indicated as time t5 to t6; a fourth pattern indicated as time t7 to t8; and a fifth pattern indicated as time t9 to t10. However, t1 to t10 may be a continuous time series or may not be continuous. For example, the measurement may be conducted with the first pattern indicated as t1 to t2 one million times, and then the measurement may be conducted with the second pattern one million times, and further subsequently the measurement may be conducted with the third pattern one million times, and so on.

In any of the patterns, the emission time of the pump light 21 is 2 ps in common and the emission time of the probe light 31 is 30 fs in common. In any of the patterns, the probe light 31 is emitted once while the pump light 21 is emitted once. Regarding the first pattern, the pump light 21 and the probe light 31 are emitted to the specimen 900 without any delay, so that the delay time is zero. Regarding the second to fifth patterns, the delay time is T22, T33, T44, and T55, respectively. They have a relationship of T22<T33<T44<T55.

Then, a fall of PN5 and a fall of Pb5, that is, the end of emission of the pump light 21 and the end of emission of the probe light 31 in the fifth pattern are simultaneous.

The following operational advantages can be obtained according to the above-described first embodiment.

(1) The electron microscope 1 includes: the pump light output unit 2 that emits the pump light 21 to the specimen 900 and performs emission of the pump light a plurality of number of times to excite the specimen 900; the probe light output unit 3 that emits the probe light 31 to the specimen 900 once while the specimen 900 is excited by the one-time emission of the pump light; and the scanning probe 5 that detects the probe signal, which corresponds to each one-time emission of the probe light 31, from the specimen 900. The probe light output unit 3 includes the delay time adjustment unit 3A that adjusts the delay time from the start of emission of the pump light until the start of emission of the probe light. Therefore, as the pump light 21 is emitted to the specimen 900 to excite the state of the specimen and the probe signal is obtained by emitting the probe light 31 during the excitation, the state of excitation, that is, quantum dynamics can be controlled and observed. Furthermore, the probe signal indicates the state immediately below the probe 51, that is, the state of a very narrow area of nano-scale to atomic scale, the quantum dynamics of the local area can be controlled and observed by using the electron microscope 1.

(2) The pump light 21 which is output by the pump light output unit 2 in one-time emission includes less than one cycle of waves with the dominant intensity. Furthermore, the phase of the electric field in each emission of the pump light 21 is constant and that phase can be controlled. Accordingly, changes of the specimen 900 caused by the emitted pump light 21 can be controlled precisely. If the phase of the pump light 21 which is emitted in one-time emission were not constant, reproducibility of the pump light 21 would become poor; and particularly because changes with time from the start of emission of the pump light 21 would not be constant, the probe signal would not be reproduced. Specifically speaking, for example, the probe signal obtained when conducting the measurement as indicated at the time t1 to t2 in FIG. 4 would be different every time. As a matter of course, not all the properties of the specimen 900 would fail to be obtained; however, only a measured value which is, so to speak, averaged and ambiguous could be obtained. Therefore, how changes are being made under control of the pump light 21 could not be observed and we would end up measuring a relaxation process after the excitation by the pump light 21. On the other hand, in this embodiment, the pump light 21 includes less than one cycle of the waves with the dominant intensity and its phase is constant and is controlled and, therefore, the probe signal in a constant state can be obtained by a plurality of number of trials under the same conditions. Therefore, a clear measured value under sort of the specified conditions can be obtained.

(3) The probe light 31 which is output by the probe light output unit 3 in one-time emission includes less than one cycle of the waves with the dominant intensity and can control the constant phase. Therefore, an impact caused by the probe light 31 on the probe signal can be calculated with high precision and the obtained probe signal can be analyzed with excellent precision.

(Variation 1)

The present invention may be applied to a Frequency Modulation-Atomic Force Microscope (FM-AFM) which is one type of an atomic force microscope. However, this FM-AFM is operated in a noncontact mode in which it is operated only in an attraction area. In this variation, the scanning probe 5 is configured so that the probe 51 is provided at the tip of a cantilever. Then, this probe 51 is caused by external force to vibrate and the cantilever is irradiated with light, and the impact of changes of the specimen 900 is read from the amplitude and the number of vibrations. Specifically, in this variation, the quantum dynamics of the local area is controlled and observed without using the probe light 31 and by having the pump light 21 excite the specimen 900 and then reading changes of the vibrations of the cantilever after certain delay time.

In this variation, it is necessary to precisely set the distance between the probe 51 and the specimen 900 as described below. Since the interatomic force acts at an interaction distance or less which is generally said to be 1 nm or less, the state of the specimen 900 can be measured at appropriate timing by setting the distance between the cantilever and the specimen 900 and the amplitude of the cantilever.

Figure 5:
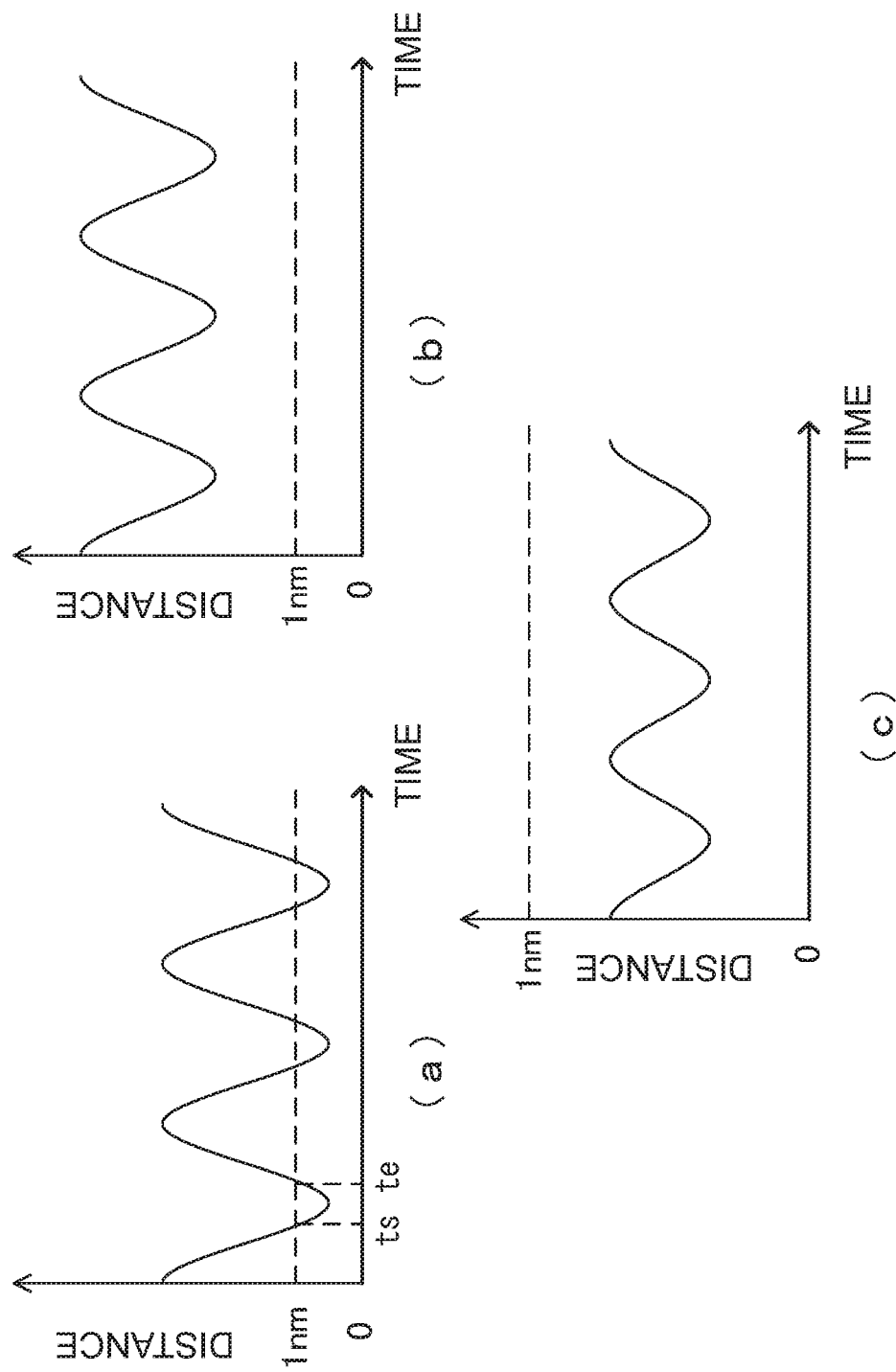
FIG. 5 is a diagram illustrating the distance between the tip of a cantilever and a specimen 900 in Variation 1.

FIG. 5(a) is a diagram illustrating appropriate distance setting in Variation 1 and FIG. 5(b) and FIG. 5(c) are diagrams illustrating inappropriate distance settings. In each of FIG. 5(a) to FIG. 5(c), the horizontal axis represents time and the vertical axis represents the distance between the specimen 900 and the tip of the cantilever. Under this circumstance, the interaction distance is set as 1 nm. Since the cantilever vibrates, the distance between the specimen 900 and the cantilever tip changes cyclically.

If the position of the cantilever and the amplitude were set as illustrated in FIG. 5(b), the tip position of the cantilever would be always farther than the interaction distance and it would be impossible to measure the state of the specimen 900. Also, if the position of the cantilever and the amplitude were set as illustrated in FIG. 5(c), the tip position of the cantilever would be always closer than the interaction distance and would be always impacted by the specimen 900. The state illustrated in FIG. 5(c) corresponds to a state where the probe light 31 is always emitting in the first embodiment.

If the position of the cantilever and the amplitude are set as illustrated in FIG. 5(a), the tip position of the cantilever is at the interaction distance or less only during the time from ts to te in vibration cycles of the cantilever and the cantilever is impacted by the specimen 900. Specifically, the time from ts to te in FIG. 5(a) corresponds to the emission time of the probe light 31 in the first embodiment, for example, the time with the width of Pb1 in FIG. 4. Therefore, operational advantages similar to those of the first embodiment can be obtained by using the FM-AFM by emitting the pump light 21 for a longer period of time than the time from ts to te as with the relationship between PN1 and Pb1 in FIG. 4. Furthermore, a non-conductive material can be also used as the specimen 900 according to this variation.

Incidentally, the frequency to vibrate the cantilever should preferably be a resonance frequency of the cantilever; and the resonance frequency of the cantilever is determined based on materials and shape of the cantilever. Furthermore, when the time during which the force of interaction acts is to be shortened, the impact on the cantilever will be minute, so that it is necessary to detect a sensitive signal, in other words, to devise some creative solution to reduce noise.

(Variation 2)

In the aforementioned first embodiment, the start of emission of the pump light 21 and the start of emission of the probe light 31 are simultaneous in the first pattern and the end of emission of the pump light 21 and the end of emission of the probe light 31 are simultaneous in the fifth pattern. However, in the first pattern, the start of emission of the pump light 21 and the start of emission of the probe light 31 do not have to coincide with each other; and in the fifth pattern, the end of emission of the pump light 21 and the end of emission of the probe light 31 do not have to coincide with each other. Furthermore, the delay time adjusted by the delay time adjustment unit 3A does not have to be in five patterns and there may be at least one pattern of such delay time. Furthermore, the probe light output unit 3 may further emit the probe light 31 while the pump light output unit 2 is not emitting the pump light 21.

(Variation 3)

In the aforementioned first embodiment, the probe light output unit 3 includes the delay time adjustment unit 3A. However, the pump light output unit 2 may include a configuration similar to the delay time adjustment unit 3A. In other words, in the first embodiment, the timing to output the pump light 21 is constant in any one of the first pattern to the fifth pattern and the timing to output the probe light 31 is changed; however, the timing to output the probe light 31 may be constant and the timing to output the pump light 21 may be changed. The relative relationship between the pump light 21 and the probe light 31, that is, the length of the delay time is important and which should be the reference is merely a matter of designing.

(Variation 4)

In the aforementioned first embodiment, the probe light output unit 3 includes the laser light source and the nonlinear optical crystal. However, if the output of the laser light source can be used directly as the probe light, the probe light output unit 3 does not have to include the nonlinear optical crystal. For example, in a mid-infrared region where the wavelength is approximately 800 nm, if the pulse width output from the laser light source is shorter than 5 fs, that laser beam may be used as the probe light without being emitted to the nonlinear optical crystal.

(Variation 5)

In the aforementioned first embodiment, the pump light 21 which is output in one-time emission includes less than one cycle of the waves with the dominant intensity. However, the pump light 21 which is output in one-time emission may include a plurality of cycles of the waves having the same intensity.

Figure 6:
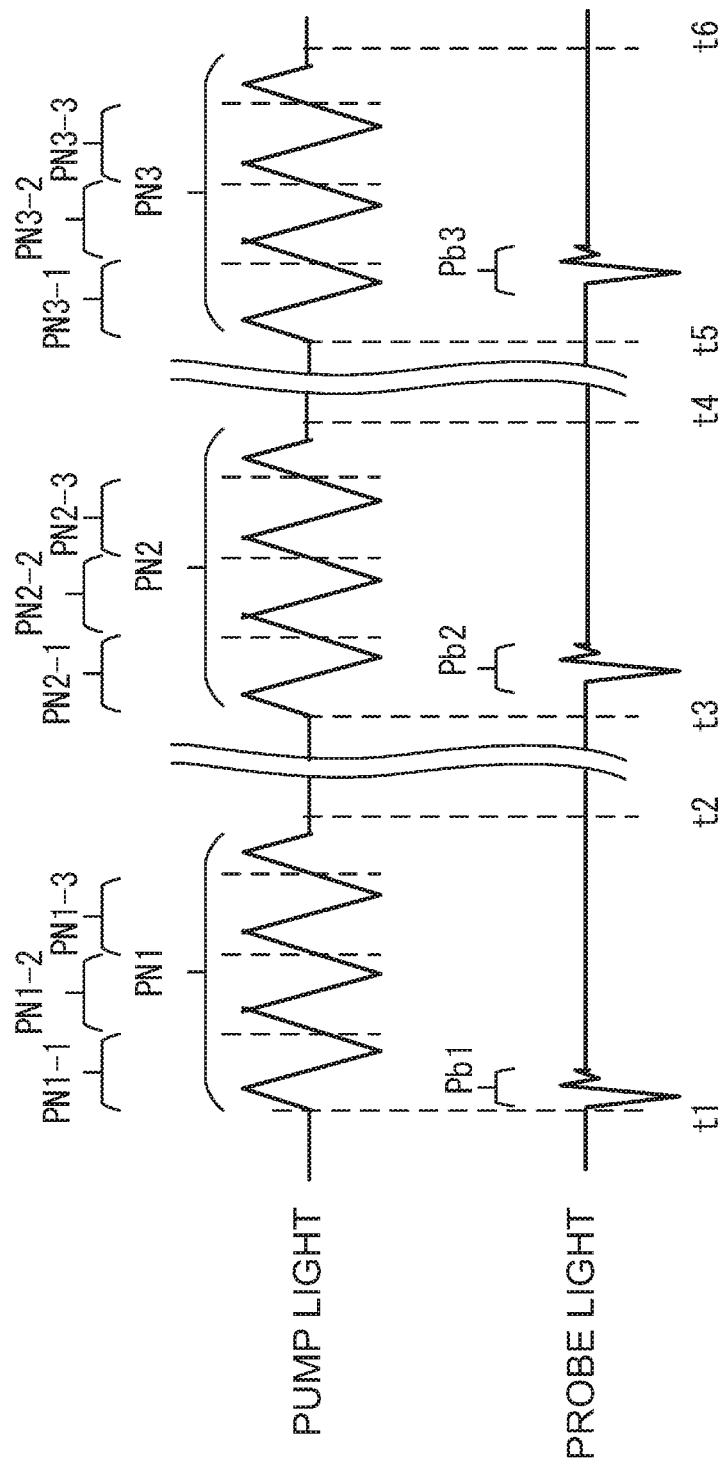
FIG. 6 is a schematic diagram illustrating time variation of the pump light 21 and the probe light 31 in Variation 5.

FIG. 6 is a schematic diagram illustrating time variation of the pump light 21 and the probe light 31 in Variation 5. In an example illustrated in FIG. 6, the pump light 21 which is output in one-time emission includes 3.5 cycles of waves with a certain constant amplitude unlike the first embodiment. On the other hand, the probe light 31 which is output in one-time emission includes less than one cycle of the waves with the dominant intensity just like the first embodiment. Specifically, for example, the measurement is conducted with a first pattern indicated at time t1 to t2 one million times, and then the measurement is conducted with a second pattern indicated at time t3 to t4 one million times, and further subsequently the measurement is conducted with a third pattern indicated at time t5 to t6 one million times. Under this circumstance, the timing to start emitting the probe light 31 is the same as the emission of the first cycle of the probe light PN1-1 in the first pattern. In the second pattern, there is a delay of first specified time from the start of emission of the same first cycle of the probe light PN2-1. In the third pattern, there is a further delay, that is, a delay of second specified time from the start of emission of the same first cycle of the probe light PN3-1.

Accordingly, when the pump light 21 which is output in one-time emission includes a plurality of cycles of the waves with specified intensity, operational advantages similar to those of the first embodiment can be obtained by setting the timing to emit the probe light 31 to coincide with a specified cycle of the pump light 21. Specifically, in this variation, the timing to emit the probe light 31 is set to coincide with the first cycle of the pump light 21; however, the timing to emit the probe light 31 may be set to coincide with the second cycle or the third cycle.

(Variation 6)

In the aforementioned first embodiment, the probe light 31 includes less than one cycle of the waves with the dominant intensity. However, the probe light 31 may have an additional condition that positive and negative polarities of the electric field are asymmetric, or an additional condition that the probe light 31 includes less than a half cycle of only one polarity. The condition that the positive and negative polarities are asymmetric may be added because in a case of the positive and negative polarities which are symmetric, integration with respect to the electric field intensity results in zero, which is not desirable. Furthermore, only either the positive polarity or the negative polarity may be used and less than a half cycle may be included in order to prevent offsetting of the positive and negative polarities when integrated.

Second Embodiment

A second embodiment of an electron microscope which is the scanning probe microscope according to the present invention will be explained with reference to FIG. 7 to FIG. 8. In the following explanation, the same reference numerals are assigned to the same constituent elements as those in the first embodiment and the differences between the embodiments will be mainly explained. Points which are not particularly explained are the same as the first embodiment. In this embodiment, the main difference from the first embodiment is that modulation of the probe light is performed.

Figure 7:
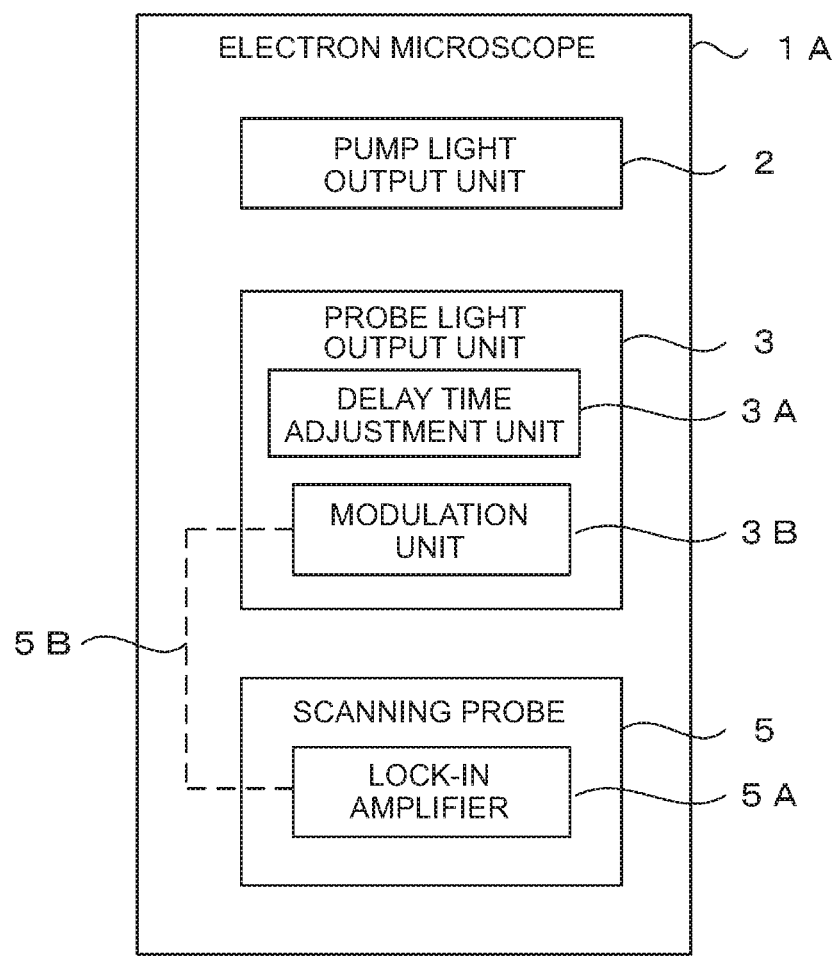
FIG. 7 is a diagram illustrating a schematic configuration of an electron microscope 1A according to a second embodiment.

FIG. 7 is a diagram illustrating a schematic configuration of an electron microscope 1A according to the second embodiment. The probe light output unit 3 according to this embodiment includes, in addition to the configuration of the first embodiment, a modulation unit 3B that performs on-off keying or phase modulation. The scanning probe 5 includes a lock-in amplifier 5A in addition to the configuration of the first embodiment. The lock-in amplifier 5A is coupled to the modulation unit 3B via a signal line 5B. The modulation unit 3B outputs a reference signal to the lock-in amplifier 5A via the signal line 5B. The lock-in amplifier 5A extracts a component synchronized with the probe light 31 from the probe signal by using the reference signal which is input from the modulation unit 3B.

(Modulation Unit 3B)

The modulation unit 3B can implement the on-off keying by using, for example, a slit. Particularly, the cyclic probe light 31 can be easily blocked by rotating a slit plate 110 described later which has an opening in a circumferential direction.

Figure 8:
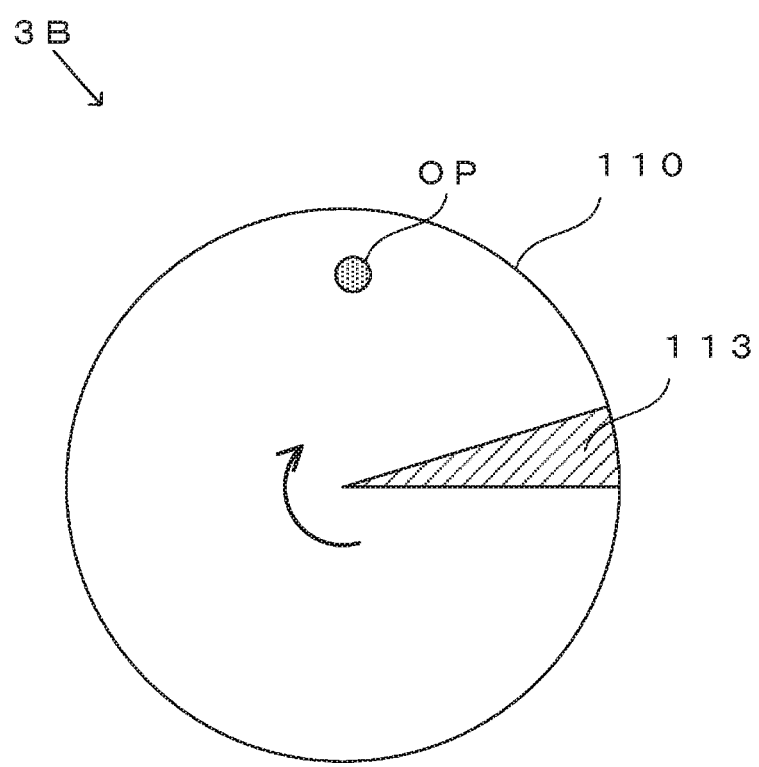
FIG. 8 is a diagram illustrating the configuration of a modulation unit 3B when performing on-off keying.

FIG. 8 is a diagram illustrating the configuration of the modulation unit 3B when performing the on-off keying. The modulation unit 3B can implement the on-off keying by using the slit plate 110. The slit plate 110 includes a notch 113. The reference numeral OP indicated with hatching represents an optical path of the probe light 31. Referring to FIG. 8, the position of the optical path OP is constant; and when the slit plate 110 rotates and the notch 113 reaches the position of the optical path OP, the probe light 31 is emitted to the specimen 900.

The modulation unit 3B can control the phase, that is, carrier-envelope phase (CEP) by using, for example, two lenses described below indicated with the reference numeral 121 and the reference numeral 122.

Figure 9:
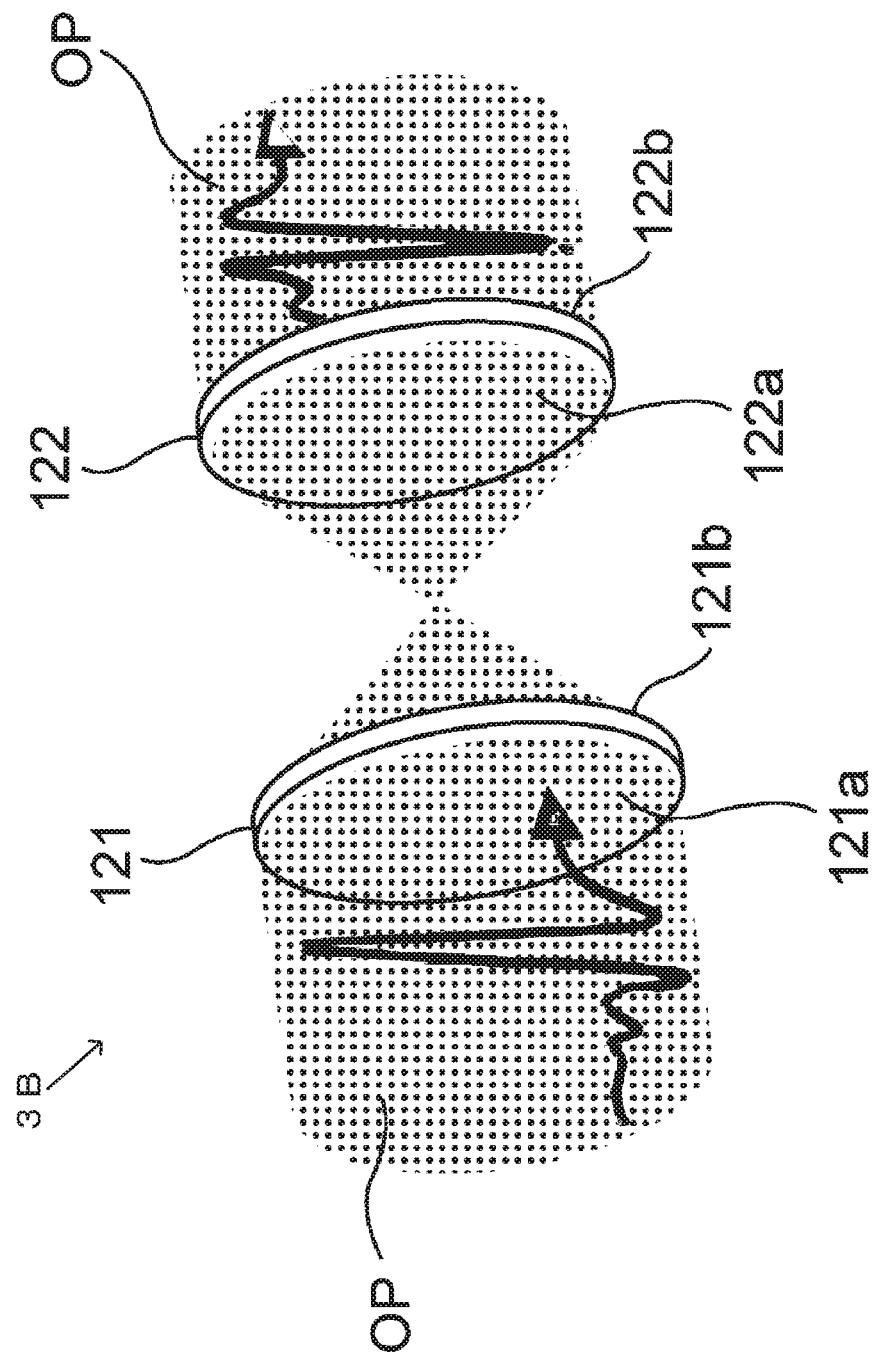
FIG. 9 is a diagram illustrating the configuration of the modulation unit 3B when performing phase modulation.

FIG. 9 is a diagram illustrating the configuration of the modulation unit 3B when performing phase modulation. Referring to FIG. 9, the reference numeral OP indicated with hatching represents an optical path of the probe light 31. A first lens 121 and a second lens 122 are placed opposite each other relative to the optical path OP as illustrated in FIG. 9. The probe light 31 can be controlled to a desired CEP by making the probe light 31 transmit through the first lens 121 and the second lens 122.

Materials for the first lens 121 and the second lens 122 may be any materials that have transparency for the probe light 31; and any materials with higher transparency are more preferable. The shapes of the first lens 121 and the second lens 122 should preferably be the same and spherical lenses or cylindrical lenses can be selected according to an aspect of the desired CEP. When the spherical lenses are placed as the first and second lenses in the modulation unit 3B, the probe light 31 of a cosine type ($\varphi cep=0$) can be converted to an inverse cosine type ($\varphi cep=\pi$). On the other hand, when the cylindrical lenses are placed as the first and second lenses, the probe light 31 of the cosine type can be converted to a sine type ($\varphi cep=\pi/2$). The direction of the electric field can be controlled by controlling the phase of the probe light 31.

Then, the phase of the probe light 31 can be switched depending on whether or not the probe light 31 is made to transmit through the first lens 121 and the second lens 122. For example, switching is made between whether the probe light 31 of the cosine type ($\varphi cep=0$) should be made to output directly, or to transmit through one set of the lenses and output as the inverse cosine type ($\varphi cep=\pi$), or to output as $\varphi cep=\pi/2$.

Each of the first lens 121 and the second lens 122 has at least one incidence plane and one emission plane. An emission plane 121b of the first lens 121 and an incidence plane 122a of the second lens 122 are placed opposite each other. In FIG. 9 which illustrates a specific example of an aspect to place the spherical lenses, the first lens 121 and the second lens 122 are placed so that: the emission plane 121b of the first lens 121 and the incidence plane 122a of the second lens 122 are placed opposite each other; and THz waves transmit from the incidence plane 121a of the first lens 121 to the emission plane 121b, and then transmit from the incidence plane 122a of the second lens 122 to the emission plane 122b. In a case where the cylindrical lenses are used, they should preferably be placed in the same manner.

The following operational advantage can be obtained according to the above-described second embodiment.

(4) The probe light output unit 3 includes the modulation unit 3B that modulates the probe light. The electron microscope 1A includes the lock-in amplifier 5A that extracts the component synchronized with the probe light, which is modulated by the modulation unit 3B, from the probe signal. Therefore, a desired signal can be obtained even if the probe signal contains noise. Incidentally, if an energy amount of the probe light 31 is relatively small, the on-off keying which is easily implemented can be used. However, if the energy amount of the probe light 31 is relatively large and the on-off keying is performed, the probe 51 expands and contracts in conjunction with on and off of the probe light 31 and is impacted significantly, that is, becomes a new noise source. In such a case, the phase modulation is used.

(Variation 1 of Second Embodiment)

The modulation unit 3B may perform modulation other than the on-off keying and the phase modulation. For example, the modulation unit 3B may perform delay time modulation.

(Variation 2 of Second Embodiment)

In the aforementioned second embodiment, the probe light output unit 3 includes the modulation unit 3B. However, the pump light output unit 2 may include a modulation unit. This variation can also obtain the advantageous effect of being capable of obtaining a desired signal even if the probe signal contains noise.

Third Embodiment

A third embodiment of an electron microscope which is the scanning probe microscope according to the present invention will be explained with reference to FIG. 10. In the following explanation, the same reference numerals are assigned to the same constituent elements as those in the first embodiment and the differences between the embodiments will be mainly explained. Points which are not particularly explained are the same as the first embodiment. In this embodiment, the main difference from the first embodiment is that the probe light is emitted a plurality of number of times while the pump light is emitted once.

The configuration of the electron microscope 1 according to the third embodiment is similar to that of the first embodiment. However, a time interval of the probe light 31 which is output from the probe light output unit 3 is shorter than that of the first embodiment. Furthermore, the scanning probe 5 performs measurement every time the probe light 31 is emitted once. Specifically, in this embodiment, the time interval of emission of the probe light 31 is shorter than that of the first embodiment, so that response time measured and recorded by the scanning probe 5 is required to be shorter than that of the first embodiment.

FIG. 10 is a schematic diagram illustrating time variation of the pump light 21 and the probe light 31. FIG. 10 corresponds to FIG. 4 in the first embodiment. The emission time of the pump light 21 is, for example, 2 ps which is the same as the first embodiment; and the emission time of the probe light 31 is, for example, 30 fs which is the same as the first embodiment. In this embodiment, the probe light 31 is emitted a plurality of number of times, for example, a total of five times as indicated as Pb1 to Pb5 in FIG. 10 while the pump light 21 is emitted. The scanning probe 5 measures and records the probe signal corresponding to each emission of the probe light 31.

The following operational advantage can be obtained according to the above-described third embodiment.

(5) The electron microscope 1 includes: the pump light output unit 2 that emits the pump light 21 to the specimen 900 and performs emission of the plump light once or more to excite the specimen; the probe light output unit 3 that emits the probe light 31 to the specimen 900 twice or more while the specimen 900 is excited by the one-time emission of the pump light; and the scanning probe 5 that detects the probe signal corresponding to each one-time emission of the probe light 31. Therefore, advantageous effects similar to those of the first embodiment can be obtained in a short amount of time. In other words, the electron microscope 1 according to the third embodiment can control and observe the quantum dynamics in a short amount of time.

(Variation 1 of Third Embodiment)

In the above-described third embodiment, the start of emission of the pump light 21 and the start of the first emission of the probe light 31 are simultaneous and the end of emission of the pump light 21 and the end of the fifth emission of the probe light 31 are simultaneous. However, the start of emission of the pump light 21 and the start of the first emission of the probe light 31 do not have to coincide with each other and the end of emission of the pump light 21 and the end of the fifth emission of the probe light 31 do not have to coincide with each other. Furthermore, the number of times the probe light 31 is emitted while the pump light 21 is emitted once does not have to be five times and may be twice or more. Specifically, it is only required that the probe light 31 is emitted at least twice during the emission of the pump light 21 and the timing difference between the start of emission of the pump light 21 and the start of the emission of the probe light 31 is clear. Furthermore, the probe light 31 may be further emitted while the pump light 21 is not emitted.

(Variation 2 of Third Embodiment)

In the above-described third embodiment, the pump light 21 which is output in one-time emission includes less than one cycle of the waves with the dominant intensity. However, the pump light 21 which is output in one-time emission may include a plurality of cycles of waves having the same intensity. In this case, the probe light 31 is output as many times as the number of cycles included in one-time emission of the pump light 21.

FIG. 11 is a schematic diagram illustrating time variation of the pump light 21 and the probe light 31 according to Variation 6. In an example illustrated in FIG. 11, the pump light 21 which is output in one-time emission includes three cycles of waves having a certain constant amplitude unlike the first embodiment. Broken lines in FIG. 11 represent a starting point and an ending point of one cycle included in the pump light 21. In a first pattern indicated at time t1 to t4, the probe light 31 is output at the same time as the output of each cycle of the pump light 21 is started. In a second pattern indicated at and after time of day t5, the probe light 31 is output after specified delay time following the start of output of each cycle of the pump light 21. However, only part of the second pattern is illustrated for the convenience of drafting the diagram.

The second pattern may be started after the first pattern is repeated many times, for example, 100,000 times; or the second pattern may be started after the first pattern is conducted only once.

According to this variation, the output of the pump light 21 and the probe light 31 as indicated at t1 to t2 in FIG. 4 in the first embodiment is repeated a plurality of number of times, so that this variation has the advantage of enhancing the obtained probe signal more than the first embodiment.

The above-described embodiments and variations may be combined with each other. In the above explanation, the various embodiments and variations have been described; however, the present invention is not limited to the content of these embodiments and variations. Other aspects which could be thought of within the scope of the technical idea of the present invention may be included within the scope of the present invention.

REFERENCE SIGNS LIST

1, 1A: electron microscope
2: pump light output unit
21: pump light
3: probe light output unit
31: probe light
3A: delay time adjustment unit
3B: modulation unit
5: scanning probe
51: probe

The invention claimed is:

1. A scanning probe microscope comprising:
a pump light output unit that emits pump light having a first specified phase to a specimen and performs emission of the pump light a plurality of number of times to excite the specimen;
a probe light output unit that emits probe light having a second specified phase to the specimen once while the pump light is emitted once to the specimen; and
a scanning probe that detects, from the specimen, a probe signal corresponding to each one-time emission of the probe light,
wherein the pump light output unit or the probe light output unit includes a delay time adjustment unit that adjusts delay time from a start of the emission of the pump light until a start of the emission of the probe light.

2. The scanning probe microscope according to claim 1, wherein the pump light which is output in one-time emission by the pump light output unit includes less than one cycle of waves with dominant intensity.

3. The scanning probe microscope according to claim 1, wherein the probe light which is output in one-time emission by the probe light output unit includes less than one cycle of waves with dominant intensity.

4. The scanning probe microscope according to claim 1, wherein the pump light output unit includes a pump light modulation unit that modulates the pump light; and
wherein the scanning probe microscope further comprise a lock-in detector that extracts a component synchronized with the pump light modulated by the pump light modulation unit from the probe signal.

5. The scanning probe microscope according to claim 1, wherein the probe light output unit includes a probe light modulation unit that modulates the probe light; and
wherein the scanning probe microscope further comprise a lock-in detector that extracts a component synchronized with the probe light modulated by the probe light modulation unit from the probe signal.

6. A scanning probe microscope comprising: a pump light output unit that emits pump light having a first specified phase to a specimen and performs emission of the pump light once or more to excite the specimen; a probe light output unit that emits probe light having a second specified phase to the specimen twice or more while the pump light is emitted once to the specimen; and a scanning probe that detects, from the specimen, a probe signal corresponding to each one-time emission of the probe light.

* * * * *